United States Patent
Van Broeck et al.

(10) Patent No.: US 10,955,911 B2
(45) Date of Patent: Mar. 23, 2021

(54) GAZED VIRTUAL OBJECT IDENTIFICATION MODULE, A SYSTEM FOR IMPLEMENTING GAZE TRANSLUCENCY, AND A RELATED METHOD

(71) Applicant: Alcatel Lucent, Nozay (FR)

(72) Inventors: Sigurd Van Broeck, Antwerp (BE); Christoph Stevens, Antwerp (BE)

(73) Assignee: Alcatel Lucent, Nozay (FR)

( * ) Notice: Subject to any disclaimer, the term of this patent is extended or adjusted under 35 U.S.C. 154(b) by 356 days.

(21) Appl. No.: 15/758,815

(22) PCT Filed: Aug. 31, 2016

(86) PCT No.: PCT/EP2016/070491
§ 371 (c)(1),
(2) Date: Mar. 9, 2018

(87) PCT Pub. No.: WO2017/042070
PCT Pub. Date: Mar. 16, 2017

(65) Prior Publication Data
US 2020/0233489 A1    Jul. 23, 2020

(30) Foreign Application Priority Data
Sep. 10, 2015   (EP) .................................. 15306381

(51) Int. Cl.
*G06F 3/01*       (2006.01)
*G06F 3/0481*     (2013.01)
(Continued)

(52) U.S. Cl.
CPC .......... *G06F 3/013* (2013.01); *G06F 3/04815* (2013.01); *G06F 3/04842* (2013.01); *G06T 19/006* (2013.01)

(58) Field of Classification Search
CPC ............................. G06F 3/013; H04N 13/383
See application file for complete search history.

(56) References Cited

U.S. PATENT DOCUMENTS

| | | | |
|---|---|---|---|
| 2002/0033835 A1* | 3/2002 | Sowizral | ............... G06T 15/405 345/645 |
| 2005/0168402 A1 | 8/2005 | Culbertson et al. | |

(Continued)

FOREIGN PATENT DOCUMENTS

| | | |
|---|---|---|
| EP | 2642752 A1 | 9/2013 |
| EP | 2947545 A1 | 11/2015 |

(Continued)

OTHER PUBLICATIONS

English Bibliography of Japanese Patent No. 2005216310A, Published Nov. 8, 2005, Printed from Derwent Innovation on Jul. 8, 2019, 5 pages.

(Continued)

*Primary Examiner* — Kevin M Nguyen
(74) *Attorney, Agent, or Firm* — Fay Sharpe LLP

(57) ABSTRACT

A method, system and related devices are provided for identifying, for a user, a virtual child object of a virtual parent object of virtual parent objects based on a determined distance between a gazed virtual child object of a virtual parent object of said virtual parent objects and a gaze distance origin, based on captured gaze information. The captured gaze information comprising gaze coordinates representing a position on a display at which said user is looking. The display being configured to display a virtual scene representation of a virtual scene. The virtual scene representation comprising virtual object representations of virtual parent objects. Each virtual parent object of said virtual parent objects comprising at least one virtual child object. The method comprises identifying, for said user, said (Continued)

virtual child object of said virtual parent object of said virtual parent objects based on said determined distance.

19 Claims, 4 Drawing Sheets

(51) Int. Cl.
 *G06F 3/0484* (2013.01)
 *G06T 19/00* (2011.01)

(56) References Cited

U.S. PATENT DOCUMENTS

| | | |
|---|---|---|
| 2013/0109478 A1 | 5/2013 | Matsumaru et al. |
| 2015/0055808 A1* | 2/2015 | Vennstrom ............ G06F 3/013 381/307 |
| 2015/0085056 A1 | 3/2015 | Van Broeck |
| 2015/0153571 A1* | 6/2015 | Ballard ................. G06F 3/013 345/8 |
| 2015/0205362 A1 | 7/2015 | Park et al. |

FOREIGN PATENT DOCUMENTS

| | | |
|---|---|---|
| EP | 2947546 A1 | 11/2015 |
| JP | 2005216310 A | 8/2005 |
| JP | 2013094437 A | 5/2013 |
| WO | WO 2014/178005 A1 | 11/2014 |

OTHER PUBLICATIONS

English Bibliography of Japanese Patent No. 2013094437A, Published May 20, 2013, Printed from Derwent Innovation on Jul. 8, 2019, 5 pages.

European Patent Application No. 15306381.3-1972, Extended European Search Report, dated Feb. 23, 2016, 9 pages.

PCT Patent Application No. PCT/EP2016/070491, Written Opinion of the International Searching Authority, dated Oct. 31, 2016, 8 pages.

Andrew T. Duchowski et al., "Binocular Eye Tracking in VR for Visual Inspection Training," Proceedings of the ACM Symposium on Virtual Reality Software and Technology, XP001229447, pp. 1-8, Nov. 15-17, 2001.

International Search Report for PCT/EP2016/070491 dated Oct. 31, 2016.

\* cited by examiner

## GAZED VIRTUAL OBJECT IDENTIFICATION MODULE, A SYSTEM FOR IMPLEMENTING GAZE TRANSLUCENCY, AND A RELATED METHOD

FIELD OF THE INVENTION

The present invention relates to the field of gaze translucency systems, and in particular to a system for implementing gaze translucency on a display configured for displaying to a user a virtual scene representation of a virtual scene, said virtual scene representation comprising a number of virtual object representations of virtual objects; a method for the same; a computer program for the same; a gaze distance determination module and a virtual object modification module.

TECHNICAL BACKGROUND OF THE INVENTION

Eye gaze is a useful element when communicating in group with three or more people. The eye gaze information is useful for the person talking, in order to direct his attention to a specific person and to get feedback from him; for the listeners, in order to understand who the speaker is talking to and whom (or what) the other listeners are looking at; and for turn-taking. As such, people can see each other, they know that other people can see them, and they know that the other people know that they can see them. This reciprocal characteristic is referred to as gaze translucency.

In face-to-face conversations, the eye gaze of an individual is easy to detect. However, in today's multi-party video calls (Computer Mediated Communications), all participants are looking almost directly into their small monitor at the (mosaic of) other people whereby eye gaze direction is almost completely lost. All the advantages of gaze translucency are therefore lost. Moreover, each individual feels as if every other participant is looking directly at him. All participants therefore feel that they get much more attention than they would normally attract or deserve in the given social setting.

In other settings, gaze translucency is useful to determine whether or not participants are looking at whatever they should be looking. For example, in a classroom setting in which a virtual scene is displayed containing virtual objects, one of which should be paid attention to, the teacher would like to ensure that the students are looking at that virtual object of that virtual scene that is the subject of teaching.

In other settings, such as automotive, e-health or gaming settings, it may be useful to capture information about what things an agent is looking at, and to support or redirect that agent's attention as necessary. A car driver would profit, for example, from having his attention directed to important road signs or potentially dangerous elements on the road. A driver or pilot may find it useful to have her attention gently directed to a flashing warning sign on an intelligent instrument panel.

If individual ornaments can be identified by a module and such additional information is not taken into account and, valuable information is lost: a first user will not know what ornament of the user, i.e. a ring, a tattoo, a facial expression or parts of the face or object representation a second user is looking at and eventually the gaze at the ornament of a user might lead to mutual gaze is not occurring.

SUMMARY OF THE INVENTION

An objective of the present invention is to provide with a method, a system and related devices for implementing gaze translucency on a display configured to displaying to a user a virtual scene representation of a virtual scene, but wherein the aforementioned shortcoming or drawbacks of the known solutions are alleviated or overcome.

Accordingly, embodiments of the present invention relate to a gazed virtual object identification module (GVOIM) being configured to identify, for a user, a gazed virtual child object of a virtual parent object of virtual parent objects based on a determined distance between said gazed virtual child object of a virtual parent object of said virtual parent objects and a gaze distance origin, based on captured gaze information, said captured gaze information comprising gaze coordinates (P) representing a position on said display at which said user is looking, said display being configured to display a virtual scene representation (VSR) of a virtual scene, said virtual scene representation comprising virtual object representations (P1, P2) of virtual parent objects; each virtual parent object of said virtual parent objects comprising at least one virtual child object, wherein:

said gazed virtual object identification module (GVOIM) is configured to identify, for said user, said gazed virtual child object of said virtual parent object of said virtual parent objects based on said determined distance; and said gazed virtual object identification module (GVOIM) additionally is configured to identify said virtual parent object of said virtual parent objects corresponding to said gazed virtual child object, based on said gazed virtual child object identified and an object hierarchy associated to said virtual parent object.

Another embodiment of the present invention relates to the gazed virtual object identification module (GVOIM) according to claim 1, wherein said gazed virtual object identification module (GVOIM) further is configured to identify, for said user, said gazed virtual child object of said virtual parent object of said virtual parent objects based on said determined distance and additional semantic information.

An embodiment of the present invention relates to a system for implementing gaze translucency on a display (DP) configured to display to a user a virtual scene representation (VSR) of a virtual scene, said virtual scene representation comprising virtual object representations (P1, P2) of virtual parent objects, each virtual parent object of said virtual parent objects comprising at least one virtual child object, wherein said system comprises:

a gaze capture module (GCM) configured to capture gaze information of said user, said gaze information comprising gaze coordinates (P) representing a position on said display at which said user is looking; and a gaze distance determination module (GDDM) configured to determine a distance between a gazed virtual child object of a virtual parent object of said virtual parent objects and a gaze distance origin, based on said captured gaze information; and a gazed virtual object identification module (GVOIM) according to claim 1.

An embodiment of the present invention relates to a system for implementing gaze translucency according to claim 3, wherein said system further comprises:

a gaze translucency algorithm module (GTAM) configured to assign a modification command to at least one of said gazed virtual child object and said virtual parent object, based on said identified gazed virtual child object.

An embodiment of the present invention relates to a system for implementing gaze translucency according to claim 4, wherein said system further comprises:

a virtual object modification module (VOMM) configured to modify said at least one of an identified gazed virtual child object or virtual parent object, based on their assigned modification command.

An embodiment of the present invention relates to a Computing device comprising a gazed virtual object identification module (GVOIM) according to claim 1.

An embodiment of the present invention relates to a Server comprising a gazed virtual object identification module (GVOIM) according to claim 1.

An embodiment of the present invention relates to a method for identifying, for a user, a virtual child object of a virtual parent object of virtual parent objects based on a determined distance between a gazed virtual child object of a virtual parent object of said virtual parent objects and a gaze distance origin, based on captured gaze information, said captured gaze information comprising gaze coordinates (P) representing a position on said display at which said user is looking, said display being configured to display a virtual scene representation (VSR) of a virtual scene, said virtual scene representation comprising virtual object representations (P1, P2) of virtual parent objects, each virtual parent object of said virtual parent objects comprising at least one virtual child object, wherein said method comprises the steps of:

identifying, for said user, said gazed virtual child object of said virtual parent object of said virtual parent objects based on said determined distance; and additionally identifying said virtual parent object of said virtual parent objects corresponding to said gazed virtual child object, based on said virtual child object identified and an object hierarchy associated to said virtual parent object.

An embodiment of the present invention relates to a method for implementing gaze translucency on a display configured to display to a user a virtual scene representation of a virtual scene, said virtual scene representation comprising virtual object representations (P1, P2) of virtual parent objects; each virtual parent object of said virtual parent objects comprising at least one virtual child object, wherein said method comprises the steps of:

a gaze capture module (GCM) capturing gaze information of said user, said gaze information comprising gaze coordinates (P) representing a position on said display at which said user is looking); and wherein said method further comprises the steps of:

a gaze distance determination module (GDDM) determining a distance between a gazed virtual child object of a virtual parent object of said virtual parent objects and a gaze distance origin, based on said captured gaze information; and a gazed virtual object identification module (GVOIM) identifying, for said user, said gazed virtual child object of said virtual parent object of said virtual parent objects based on said determined distance; and said gazed virtual object identification module (GVOIM) additionally identifying said virtual parent object of said virtual parent objects corresponding to said gazed virtual child object, based on said gazed virtual child object identified and an object hierarchy associated to said virtual parent object.

An embodiment of the present invention relates to a method for implementing gaze translucency according to claim 9, wherein said method comprises the step of identifying, for said user, said gazed virtual child object of said virtual parent object of said virtual parent objects based on said determined distance and additionally semantic information.

An embodiment of the present invention relates to a Computer program comprising computer executable instructions configured to perform when executed, the steps of method according to claim 8.

In this way, by first capturing gaze information of said user, where said gaze information comprising gaze coordinates representing a position on said display at which said user is looking and subsequently determining a distance between a gazed virtual child object corresponding to a virtual parent object of said virtual parent objects and a gaze distance origin, based on said captured gaze information and subsequently identifying, for said user, a virtual child object of a virtual parent object of said virtual parent objects based on said determined distance followed by identifying a virtual parent object of said virtual parent objects corresponding to said gazed virtual child object, based on said virtual child object identified and an object hierarchy associated to said virtual parent object.

First, the gaze information of said user is captured, for instance, but not limited to, by means of an eye-tracking means, where said gaze information comprises gaze coordinates representing a position on said display at which said user is looking. Alternatively, such gaze information is extracted from information resulting from the analysis of the captured visual activity from the brain.

Subsequently, a distance between a virtual child object that corresponds to a virtual parent object of said virtual parent objects and a gaze distance origin is determined based on said captured gaze information. Finally based on said determined distance, a gazed virtual child object is identified whereafter based on the identified gazed virtual child object and based on an object hierarchy that is associated to said virtual parent object, the virtual parent object is identified that corresponds to the determined gazed virtual parent object.

The object hierarchy, alternatively, may be based on multiple gaze distance determinations as either the child objects can be distinguished based on different depth levels meaning one after the other (partly or mainly occluded), or otherwise if this is not the case, by launching different rays from the gaze distance origin with a small variation in direction we supposedly "scan" the environment. In this way as different objects are detected, based on the object description and its metadata and depth we are able to conclude whether or not they are part of the main object. Additionally the latter may be combined with info obtainable from techniques based on point cloud or mesh segmentation in order to dynamically support scene changes.

Such an object hierarchy represents the composition of each virtual parent object comprising at least one virtual child object. Such object hierarchy of such virtual parent may comprise a tree structure indicating the composition of a virtual parent object wherein each branch of the tree may comprise a virtual child object of the parent object or of a virtual child object.

An alternative object hierarchy may be a search based hierarchy, which scales better for scenes comprising a large number of objects and sub-objects.

Based on multiple gaze determinations, point cloud—and or mesh segmentation techniques or a combination thereof, semantic information could be added for the child objects to the parent object of the virtual scene, this allows for organization of the data based on gaze distance, similarity etc and allows for search based info allocation i.o. moving through a tree hierarchy. This data may be stored in a large data base such as apache spark and based on which data machine learning principles could be applied.

Alternatively one may combine the gaze coordinates on the 2D screen in combination with variational methods for object segmentation and with neural networks or deep learning techniques allowing for real time object recognition and on the fly description of the objects and parts the of 2D projection of the virtual scene which could be used to be fed in a central or global knowledge database as such helping the construct the object knowledge.

Hence, based on the identified virtual child object, the virtual child object initially is identified in the object hierarchy associated to said virtual parent object, e.g. the tree, and subsequently based hereon the virtual parent object can be identified.

In the present specification, the significance of 'gaze translucency' is intended to be 'the ability to capture information about what agents are looking at'. An 'agent' can be a human being, an animal or an inanimate object, or more generally any entity that is capable of 'gazing', including virtual objects and virtual cameras. For human beings and animals, 'gazing' is well-defined. For inanimate objects and virtual objects, the skilled person will understand that 'gazing' must be interpreted technically according to the specific setting.

In the present specification, the significance of a virtual scene is intended to be an aspect of a virtual world as it is experienced by a user. Said virtual world may be purely virtual (e.g. as in video games) or may be an augmented reality by virtually representing real-world entities (e.g. as in an enhanced automotive use setting, where real-world road indications or potential dangers are represented on a wind screen, for instance to highlight their importance). The virtual world may comprise virtual objects, including any of the following: human beings, animals, or inanimate objects, such as trees, motor parts or road signs.

The skilled person will understand that these virtual objects may gaze back at the user (or at a virtual object associated with said user).

In the above described setting of a driver having her attention drawn to a flashing warning sign on an intelligent instrument panel, the skilled person will appreciate that this is possible by having virtual objects represented on said panel gaze at the driver. The driver is aware that such intelligent panels can see what she is gazing at, and, as soon as the driver gazes back at the panel, the accountability is established.

Said aspect of a virtual world can be called a virtual scene, typically as viewed by a virtual camera. This virtual scene may comprise some (or all) of the virtual objects of said virtual world. The virtual scene may be displayed on a display as a virtual scene representation, comprising virtual object representations of those virtual objects of said virtual scene that are in view of the virtual camera (e.g. inside a view frustum) for its corresponding user.

Further, it will be appreciated by the skilled person that a 'display' may refer to any means for visualizing (i.e. provide perception of) a virtual scene, including e.g. a computer monitor, a television screen, a smartphone display, virtual reality goggles, a holographic projection (for holograms), a wall projection, a projection on an eye or retina, a wind screen projection, a helmet visor display, a contact lens display, a bionic eye, a brain-computer interface, etc.

In a further embodiment of the present invention the system further comprises a gaze translucency algorithm module configured to assign a modification command to at least one of said virtual child object and said virtual parent object, based on said identified gazed virtual child object.

Accordingly, by assigning distinct modification command to at least one of said virtual child object and said virtual parent object, based on said identified gazed virtual child object, this at least one of said identified virtual child object and said associated virtual parent object can be assigned distinct kinds of commands for modification which may imply the differentiating of this at least one of said virtual child object and said virtual parent object over the entire virtual scene in order to enable an improved presentation of at least one of said virtual child object and said virtual parent object the user is gazing at.

In other words the modification command for child and parent will most likely be different since we want the child and parent rendered differently. Hence it should be clear at which child object the user is looking while still indicating the child and parent relationship, the parent should be informed that at one of its child objects is being looked at by another user which might also eventually establish the mutual gaze of the parent of the user being looked at and the initial user gazing at the child.

In another embodiment of the present invention the system further comprises a virtual object modification module configured to modify said at least one of an identified virtual child object and/or virtual parent object, based on their assigned modification command.

In other words the modification for the child object representation and parent representation will most likely be different since we want the child and parent to be rendered differently. It should be clear at which child object the user is looking while still indicating the child and parent relationship. The parent object representation should be informed that at one of its child objects is being looked at by another user which might also eventually establish the mutual gaze of the parent between the user being looked at and the initial user gazing at the child object.

Accordingly, by factually modifying said at least one of said virtual child object and said virtual parent object, based said assigned-to modification command, said identified gazed virtual child object is possibly modified in accordance with its own modification command which may imply the differentiating of the gazed at, at least one of said virtual child object and said virtual parent object over the entire virtual scene in order to enable an improved factual presentation of this at least one of said virtual child object and said virtual parent object, the user is gazing at.

Further characterizing embodiments of the present method it is to be noticed that the term 'comprising', used in the claims, should not be interpreted as being restricted to the means listed thereafter. Thus, the scope of the expression 'a device comprising means A and B' should not be limited to devices consisting only of components A and B. It means that with respect to the present invention, the only relevant components of the device are A and B.

Similarly, it is to be noticed that the term 'coupled', also used in the claims, should not be interpreted as being restricted to direct connections only. Thus, the scope of the expression 'a device A coupled to a device B' should not be limited to devices or systems wherein an output of device A is directly connected to an input of device B. This means that there exists a path between an output of A and an input of B which may be a path including other devices or means.

BRIEF DESCRIPTION OF THE DRAWINGS

The above and other objects and features of the invention will become more apparent and the invention itself will be best understood by referring to the following description of an embodiment taken in conjunction with the accompanying drawings wherein.

In the figures, like or similar elements have been numbered equally or analogously. The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

DESCRIPTION OF EMBODIMENTS

Figure 1:
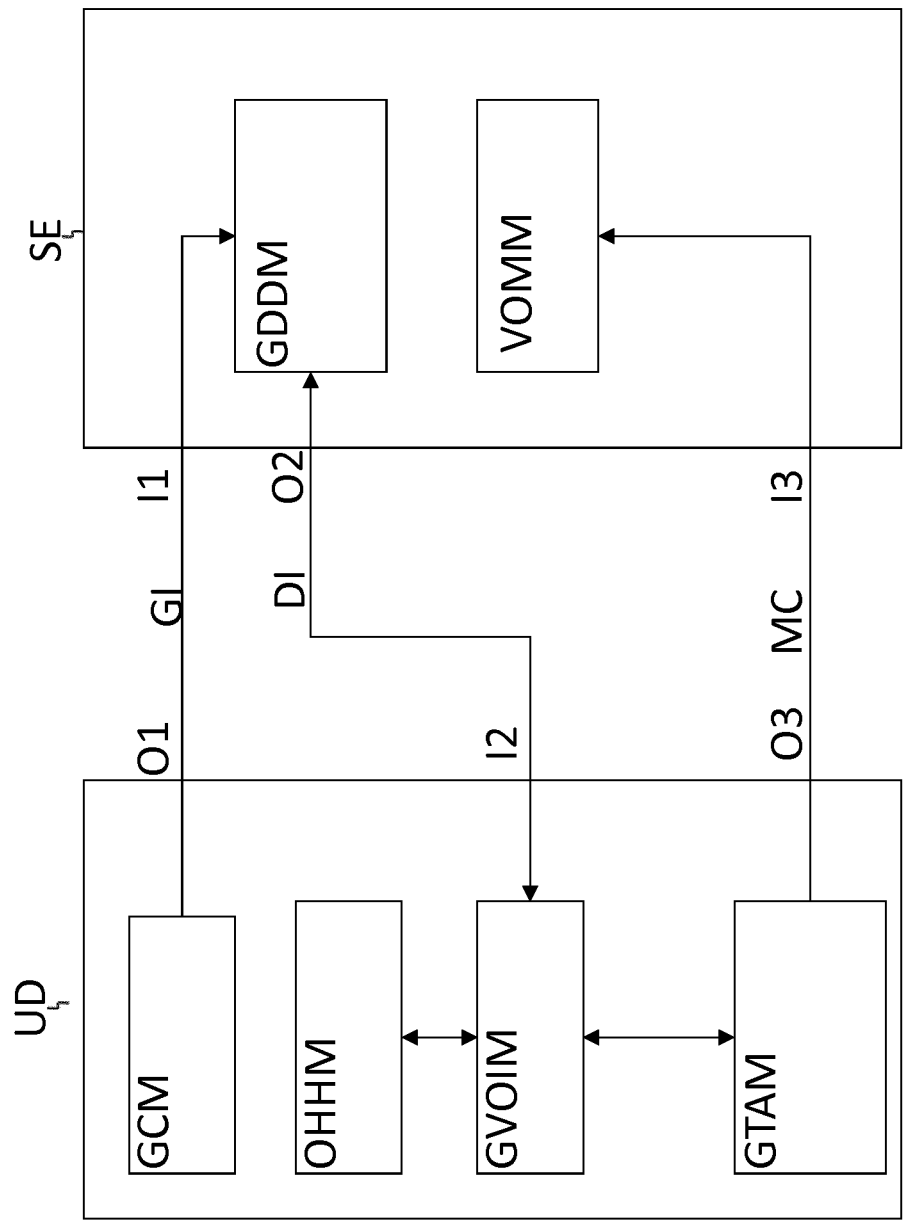
FIG. 1 represents the functional structure of a user device UD and a server device SE according to an embodiment of the present invention.

In the following paragraphs, referring to the drawing in FIG. 1, an implementation of the system for implementing gaze translucency on a display configured to display to a user a virtual scene representation VSR according to an embodiment of the present invention is described. In a further paragraph, all connections between the elements of the system according to the present invention are defined. Subsequently all relevant functional means of the mentioned system as presented in FIG. 1 are described followed by a description of all interconnections.

Figure 2:
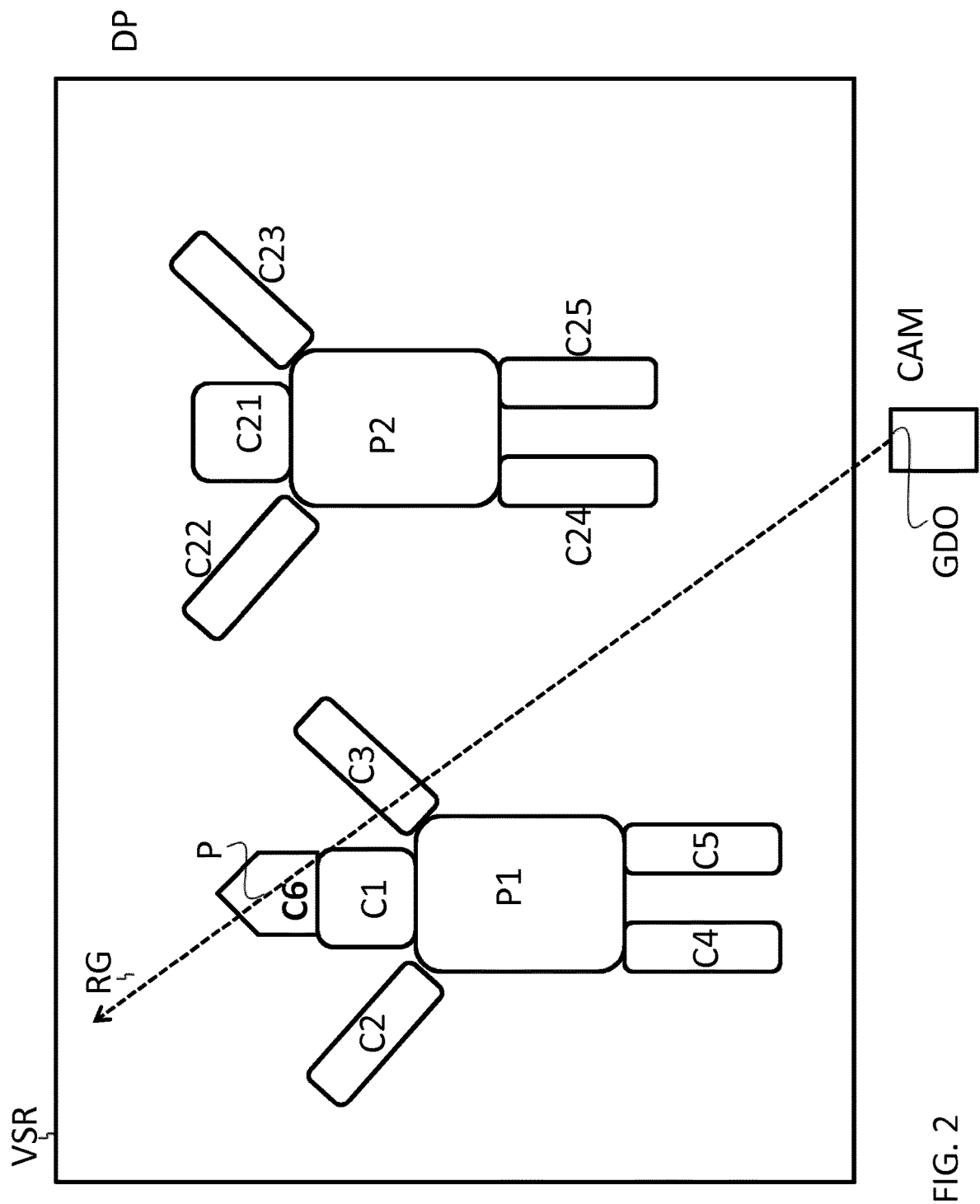
FIG. 2 illustrates a set-up for a 3D virtual scene of a system embodiment according to the present invention.
Figure 3:
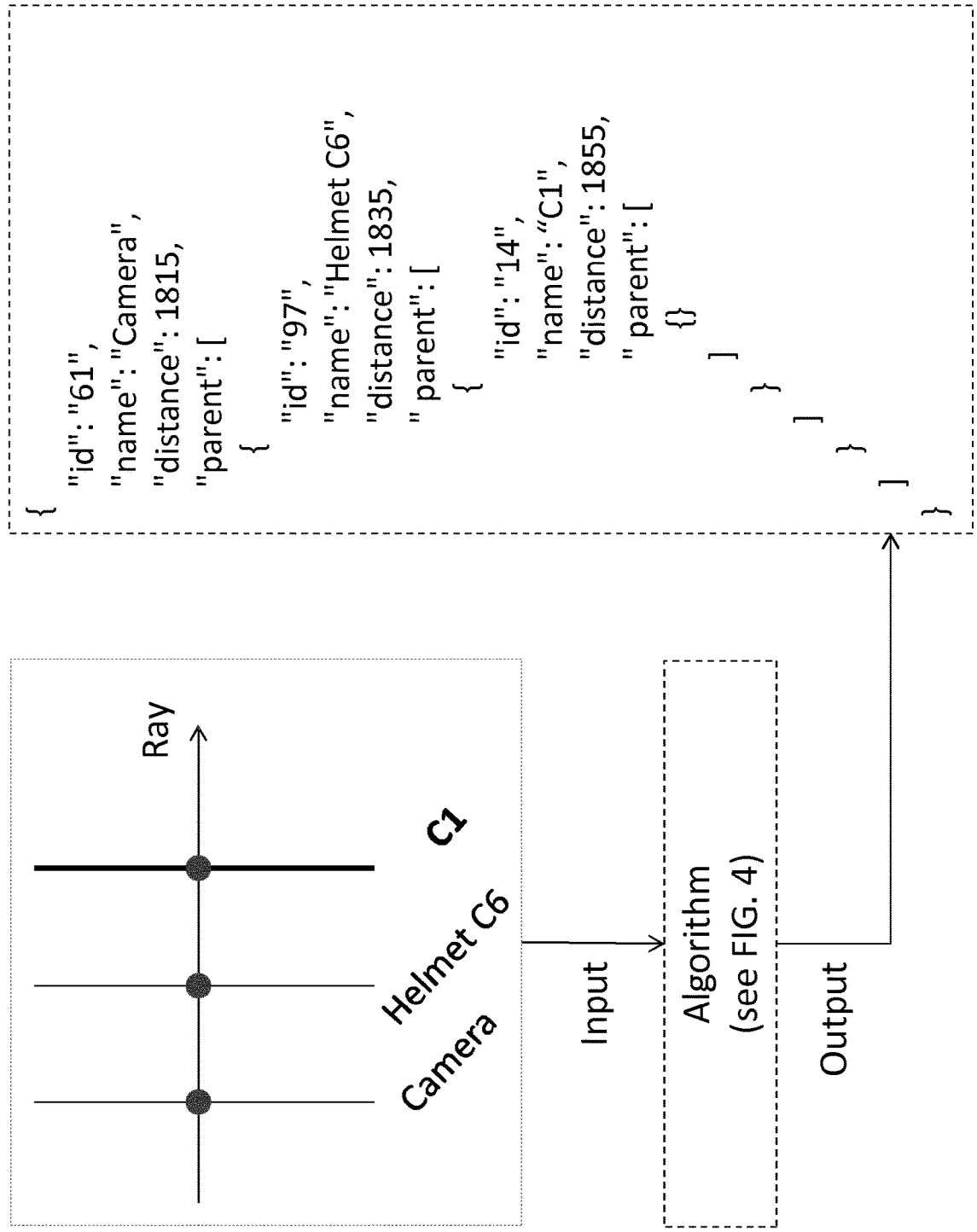
FIG. 3 illustrates an example of distance based object hierarchy tree which is part of the OHHM module of the present invention.
Figure 4:
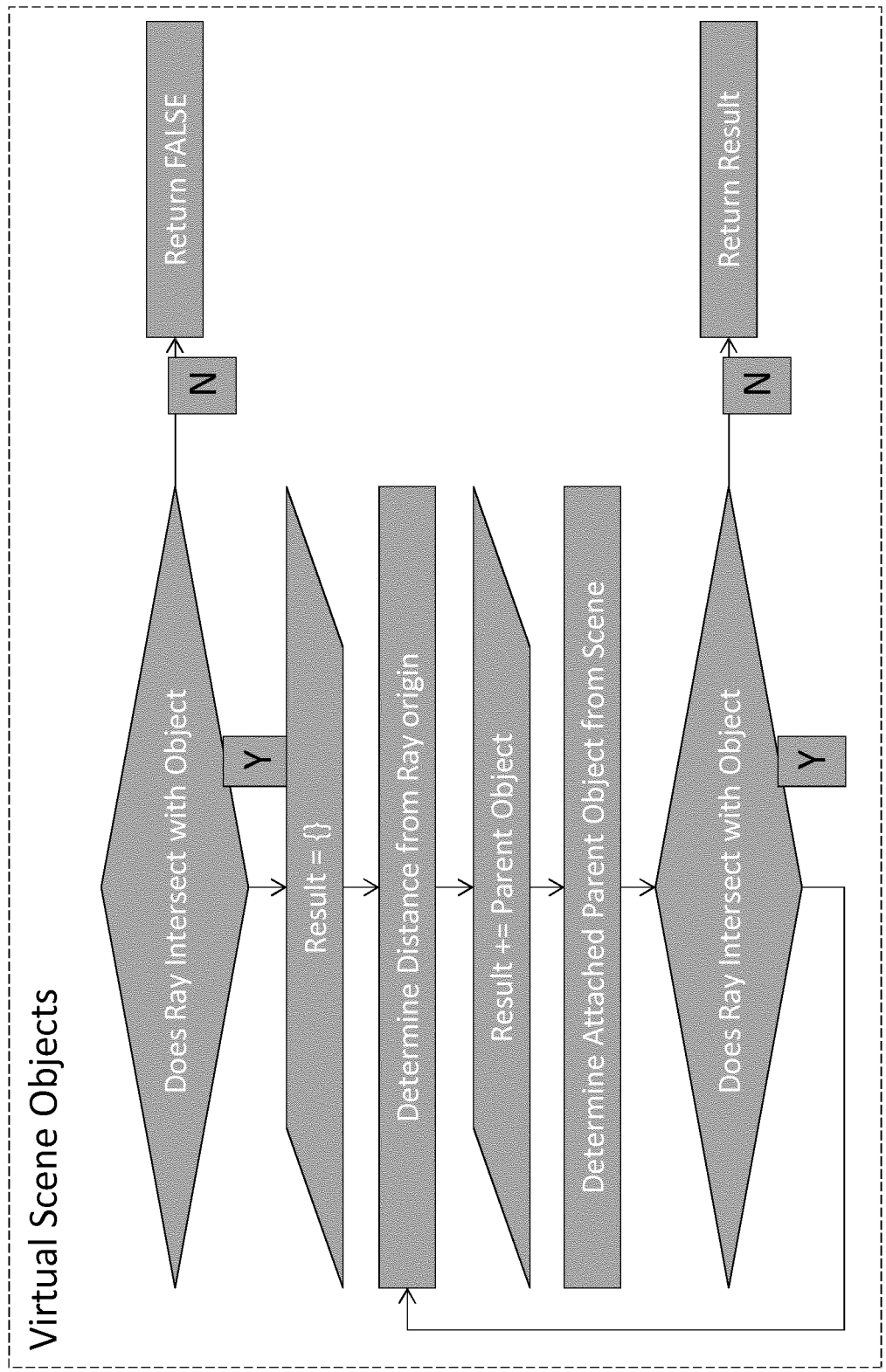
FIG. 4 illustrates the interworking between the GDDM and the GVOIM.

Subsequently, referring to the drawing in FIG. 2, representation of virtual objects P1, P2 is described.

In the succeeding paragraph the actual execution of the system is described.

Essential elements of the system of the present invention are a first entity, e.g. being a user device UD associated with a user, said user device being a computing device being configured to implement gaze translucency on a display of said user device DP that is configured to display to a user a virtual scene representation VSR of a virtual scene where, said virtual scene representation comprises virtual object representations P1, P2 of virtual parent objects; each virtual parent object of said virtual parent objects comprising at least one virtual child object. Such user device UD may be a personal computer like a desktop or laptop computer, a tablet PC a mobile phone like a smart phone or alternatively be a head mounted display for visualization and sensory input, a car, or any form or combination of user device(s) capable of rendering, visualizing a scene combined with possible sensory input to capturing eye gaze information. Amongst them contact lenses with integrated electronics and a brain interface. The latter functionality of the user device could also fully or partly be integrated with the human body.

A further essential element of the present invention is second entity, e.g. being a server SE that is configured to generate this mentioned virtual scene representation VSR of a virtual scene, where the virtual scene representation comprises a virtual object representations P1, P2 of virtual parent objects; each virtual parent object of said virtual parent objects comprising at least one virtual child object.

It is to be noted that the functionality of respectively, the client device UD and server SE may be mixed up since any combination of the functionality may exist on the client i.e. the user device UD as well as on the server SE, the user device may additionally contain a means of recording an image of the user and where the user is looking at, and/or means for rendering the VSR.

If the rendering happens at a device from which the different video streams are sent to the client devices we have a client server architecture, this however doesn't scale so well depending on the rendered representation of the VSR ($1^{st}$ or $3^{rd}$ person view). These days, every device is capable of rendering its own view with personal viewpoint and hosting some central part(s) of the gaze translucency architecture it will be more robust and scale better, so that the gaze distance determination module GDDM and the gazed virtual object modification module VOMM can be part of the client device. Currently, most mobile or fixed platform have a capable gpu of rendering a virtual scene and perform the gaze translucency algorithm, only a stream of the 3d object and it's movement, and which user is looked at needs to be streamed and distributed and handling these streams will be most probably a central piece which could be part of a server.

In this embodiment of the system according to the present invention, the user device UD comprises a gaze capture module GCM, a gazed virtual object identification module GVOIM together with an object hierarchy holding module OHHM and a gaze translucency algorithm module GTAM.

The gaze capture module GCM is configured to capture a user's gaze information GI comprising gaze coordinates, said gaze coordinates may represent a position on a display at which said user is looking or gazing (not shown).

The gazed virtual object identification module GVOIM is configured to identify, for said user, said virtual child object of said virtual parent object of said virtual parent objects based on said determined distance DI and additionally configured to identify said virtual parent object of said virtual parent objects corresponding to said virtual child object gazed at, based on said gazed virtual child object identified and an object hierarchy associated to said virtual parent object which can be performed through consulting the OHHM module. It will be clear to the skilled person that OHHM may be part of GVOIM.

The gaze translucency algorithm module GTAM is configured to assign to one or more of said virtual objects a modification command, based on said identified gazed virtual objects.

The server SE, in this embodiment, comprises a gaze distance determination module GDDM and a virtual object modification module VOMM.

The gaze distance determination module GDDM is configured to determine a distance DI (or 'gaze distance') between a virtual object and a gaze distance origin, using said gaze information GI.

The gaze distance origin GDO is here taken to coincide with the position (and orientation) of a virtual camera CAM generating the virtual scene representation.

The virtual object modification module VOMM is configured to modify one or more virtual objects of said number of virtual objects, based on said modification command MC.

Also, the skilled person will understand that these modules may be otherwise implemented, for instance as interface implementations by one or more virtual object (or rather program code instances representing virtual objects). A gaze translucency algorithm module GTAM may be comprised by a third entity or further entity, for instance a central server. Further, another virtual object modification module VOMM' may be applied being comprised by a fourth entity or further entity. Moreover, the skilled person will appreciate that the arrows shown to cross from one entity to another may in practice be implemented as communications between the separate (distributed) entities, via a network, using various network modules configured to transmit and receive information to each other.

FIG. 2 illustrates a set-up for a 3D virtual scene of a system embodiment according to the present invention. The figure shows a virtual camera CAM, a display DP displaying a virtual scene representation VSR, (shown as a perspective continuation from a virtual camera CAM). The virtual scene representation VSR is in this case a 2D projection of a 3D virtual scene that can be managed by a 3D engine (not shown), but the skilled person will understand that the virtual scene representation VSR can be referred to as a '3D scene', in view of its nature. The virtual scene representation VSR comprises a number of virtual object representations P1, P2.

Correspondingly, the underlying virtual scene comprises virtual objects virtual parent object P1 being the representation of a person, where the parent object is built up of a plurality of virtual child objects being denoted with C1 ... C6, respectively being the head, the arms, the legs and a helmet. Further virtual parent object being virtual parent objects P2, again being the representation of a person each having a similar structure.

The skilled person will appreciate that due to the position and orientation of the virtual camera CAM, the two separate virtual objects are projected largely on the same surface area of display DP, as virtual object representations P1 and P2. For this reason, it is not immediately evident which of both virtual objects a user (not shown) is gazing at.

In order to explain the present invention first, it is assumed that a user is gazing at the helmet, being virtual child object C6, of the person A being represented by the virtual object P1. As it is not immediately evident, to a further user, which of the virtual objects and moreover which part of the gazed virtual object a user (not shown) is gazing at.

At first, a user gazes at the displayed virtual scene representation VSR which in this embodiment is displayed at a screen of a user device UD, e.g. embodied by a personal computer. This user device UD further may comprise a gaze capture module GCM that is configured to capture gaze information of said user where the gaze information comprises gaze coordinates P representing a position on said display at which said user is looking. The gaze capture module GCM may be implemented by an eye-tracking means or via a brain interface by interpreting the signals from the human visual system.

The user's gaze is taken, by the gaze capturing means GCM, to be at a position P on said display DP. The gaze capture module GCM is configured to capture gaze information comprising gaze coordinates representing said position P. For ease of illustration reference, the gaze coordinates (which may for instance be display position coordinates, or any other type of coordinates that can unambiguously represent which position on a display a user is gazing at) are here taken to coincide with the display position P, i.e. the gaze coordinates are also indicated on the figure as reference number P.

In this embodiment, each of the virtual objects implements a gaze distance determination module GDDM. Alternatively, the gaze distance determination module GDDM implements for each of the virtual objects the gaze distance determination.

A gaze distance determination module GDDM, in this embodiment, located at the server SE is configured to determine a distance between a gazed virtual child object of a virtual parent object of said virtual parent objects and a gaze distance origin, based on said captured gaze information obtained from the gaze capture module GCM. Each such gaze distance determination module GDDM is configured to determine a distance along a ray gaze RG, which is represented in this figure as a vector from a gaze distance origin GDO, extending through the gaze coordinates P, and 'into' the virtual scene (which is taken to mean that the vector can mathematically be considered to extend into the space of the virtual scene. The ray gaze RG thereby represents the user's gaze. The gaze distance origin GDO is here taken to coincide with the position (and orientation) of the virtual camera CAM. The skilled person will understand that a gaze distance origin GDO could also sensibly be defined otherwise, in order to allow determining a distance between a virtual object and some origin that is relevant to a gazing user. Also the skilled person will understand that there is no need to calculate intersections with objects of the frustum.

Since each such gaze distance determination module GDDM is configured to determine a distance between its corresponding virtual object and said gaze distance origin GDO, the skilled person will understand that the thusly determined distances represent 'how close' each of said virtual objects, represented by the respective virtual object representations P1 and P2 is to the gaze distance origin GDO, and therefore, which of said virtual objects, represented by the respective virtual object representations IP1 and P2 is being gazed at by the user. The skilled person will understand that this approach allows to find that virtual object represented by the respective virtual object representations P2 is not being gazed at by the user (elegantly, its distance along the gaze ray RG could be considered to be essentially infinite), and that virtual object represented by the respective virtual object representations P1 is closer than (i.e. more in front of) virtual object P2' (or equally, P2).

This allows a gazed virtual object identification module GVOIM to identify a gazed virtual object—in this case, virtual child object represented by the respective virtual object representations C6.

The skilled person will understand that virtual objects outside of said virtual camera's view may be culled for efficiency. Subsequently, based on the determined distance, the gazed virtual object identification module GVOIM, as well as the fact that it makes less sense to identify a child object of a parent object nearing the z far plane of the frustum. In this embodiment, located at the user device UD, is configured to identify, for said user, a virtual child object of a virtual parent object of said virtual parent objects based on the distance determined by means of the gaze distance determination module GDDM.

From the Gaze distance origin, a ray is casted into the virtual world, For every object in the scene of the view frustum it is determined if the ray intersects with such object, meaning that the ray intersects with one of its points in case of a point cloud or bounding box enclosing a group of points. In the case of a rendered mesh, it is determined whether the ray intersects with one or more of its vertices. The hereby obtained distance DI or obtained distances from the GDDM module is/are used to identify the parent or child object by means of the object hierarchy OHHM, whereby OHHM holds the hierarchical model or search based (annotated) model. Moreover, at any moment in time the GVOIM may instruct the GDDM to launch other rays to trace and in order to adapt/complete the object model, this in order to cope with the dynamicity of the virtual scene. This can happen for the view frustum and or wider in order to get the object model up to date when the view frustum changes. The methodology of the iterative process once a ray intersects with an object is explained in more detail through the included flow charts. The overall system will inform the GVOIM and additionally the object hierarchy holding means OHHM if an object appears, leaves or reappears with its identification to the scene or the view frustrum for supporting the dynamicity of the virtual scene.

Subsequently, the gazed virtual object identification module GVOIM, that is additionally configured to identify a virtual parent object of said virtual parent objects corresponding to said virtual child object gazed at, based on said virtual child object identified, i.e. the virtual child object C6 and an object hierarchy associated to said virtual parent object.

The gazed virtual object identification module GVOIM based on the determined virtual child object C6 locates an object hierarchy associated to the virtual parent object by using the determined virtual child object C6 gazed at, as an entry in the object hierarchy holding module that maintains object model hierarchies associated to various virtual parent objects.

In this manner, the system can implement gaze translucency, since information about what virtual objects users are looking at (e.g. the parts of a gazed virtual object; i.e. the virtual child object corresponding to this virtual parent object) can be used to modify for instance one or more display properties of said virtual objects. This modification can for instance be performed by a virtual object itself (e.g. by applying a shader), rather than on its rendering representation on the display (in other words: its pixel representation on said display). The skilled person will moreover understand that the gaze information GI, the determined distance(s) DI, the identified virtual object(s), and the modification command(s) MC may be implemented as a (local) system property, or as events, or as parameters to function calls. Moreover, the skilled person will understand that a network module (not shown) may be used to transmit and/or receive any of the data connections that are shown, thereby facilitating networked and distributed operation.

Further, it is to be noted that although the embodiment describes a client-server architecture wherein the present invention is implemented and executed, this also could have been implemented and executed in a peer-to-peer architecture, cloud architecture, hardware architecture, and each other form in between.

The various means of the system can be located in a central way or in a more distributed manner, where these means may be distributed over the client devices and an optional server device.

A final remark is that embodiments of the present invention are described above in terms of functional blocks. From the functional description of these blocks, given above, it will be apparent for a person skilled in the art of designing electronic devices how embodiments of these blocks can be manufactured with well-known electronic components. A detailed architecture of the contents of the functional blocks hence is not given.

While the principles of the invention have been described above in connection with specific apparatus, it is to be clearly understood that this description is merely made by way of example and not as a limitation on the scope of the invention, as defined in the appended claims.

The invention claimed is:

1. Apparatus, comprising:
at least one processor; and
at least one memory including computer program code;
the at least one memory and the computer program code configured to, with the at least one processor, cause the apparatus at least to perform:
identify, for a user, a gazed virtual child object of a virtual parent object of virtual parent objects based on a determined distance between said gazed virtual child object of a virtual parent object of said virtual parent objects and a gaze distance origin, based on captured gaze information, said captured gaze information comprising gaze coordinates representing a position on a display at which said user is looking, said display being configured to display a virtual scene representation of a virtual scene, said virtual scene representation comprising virtual object representations of virtual parent objects;
each virtual parent object of said virtual parent objects comprising at least one virtual child object:
to identify, for said user, said gazed virtual child object of said virtual parent object of said virtual parent objects based on said determined distance; and
to identify said virtual parent object of said virtual parent objects corresponding to said gazed virtual child object, based on said gazed virtual child object identified and an object hierarchy associated to said virtual parent object.

2. Apparatus according to claim 1, wherein the at least one memory and the computer program code are further configured to, with the at least one processor, cause the apparatus to at least further perform:
identifying, for said user, said gazed virtual child object of said virtual parent object of said virtual parent objects based on said determined distance and additional semantic information.

3. Computing device comprising an apparatus according to claim 1.

4. Server comprising an apparatus according to claim 1.

5. System, comprising:
at least one processor; and
at least one memory including computer program code;
the at least one memory and the computer program code configured to, with the at least one processor, cause the system at least to perform:
capture gaze information of a user of a display, said captured gaze information comprising gaze coordinates representing a position on said display at which said user is looking; and said display configured to display to said user a virtual scene representation comprising virtual object representations of virtual parent objects;

each virtual parent object of said virtual parent objects comprising at least one virtual child object: to determine a distance between a gazed virtual child object of a virtual parent object of said virtual parent objects and a gaze distance origin, based on said captured gaze information;

to identify, for said, user, said gazed virtual child object based on said determined distance; and to identify said virtual parent object of said virtual parent objects corresponding to said gazed virtual child object, based on said gazed virtual child object identified and an, object hierarchy associated to said virtual parent object.

6. System according to claim 5, wherein the at least one memory and the computer program code are further configured to, with the at least one processor, cause said system to at least further perform:

assigning a modification command to at least one of said gazed virtual child object and said virtual parent object, based on said identified gazed virtual child object.

7. System according to claim 6, wherein the at least one memory and the computer program code are further configured to, with the at least one processor, cause said system to at least further perform;

modify said at least one of an identified gazed virtual child object or virtual parent object, based on their assigned modification command.

8. A method for identifying, for a user, a virtual child object of a virtual parent object of virtual parent objects based on a determined distance between a gazed virtual child object of a virtual parent object of said virtual parent objects and a gaze distance origin, based on captured gaze information, said captured gaze information comprising gaze coordinates representing a position on a display at which said user is looking, said display being configured to display a virtual scene representation of a virtual scene, said virtual scene representation comprising virtual object representations of virtual parent objects, each virtual parent object of said virtual parent objects comprising at least one virtual child object, wherein said method comprises:

identifying, for said user, said gazed virtual child object of said virtual parent object of said virtual parent objects based on said determined distance; and additionally identifying said virtual parent object of said virtual parent objects corresponding to said gazed virtual child object, based on said virtual child object identified and an object hierarchy associated to said virtual parent object.

9. A non-transitory computer-readable medium storing program instructions that, when executed by a processor, cause an apparatus to perform the method according to claim 8.

10. The method according to claim 8, wherein the first virtual parent object is representative of a second user capable of gazing back at the user in the virtual scene representation.

11. The method according to claim 10, wherein the multiple virtual parent objects include a second virtual parent object representative of the user.

12. The method according to claim 8, wherein the first virtual parent object is representative of an inanimate object in the virtual, scene representation.

13. The method according to claim 8, wherein the virtual scene representation is representative of a virtual world that creates an augmented reality for the multiple virtual parent objects.

14. The method according to claim 8, wherein the virtual scene representation is representative of a virtual world for a video game.

15. A method for implementing gaze translucency on a display configured to display to a user a virtual scene representation of a virtual scene, said virtual scene representation comprising virtual object representations of virtual parent objects; each virtual parent object of said virtual parent objects comprising at least one virtual child object, wherein said method comprises:

capturing gaze information of said user, said gaze information comprising gaze coordinates representing a position on said display at which said user is looking;

determining a distance between a gazed virtual child object of a virtual parent object of said virtual parent objects and a gaze distance origin, based on said captured gaze information;

identifying, for said user, said gazed virtual child object of said virtual parent object of said virtual parent objects based on said determined distance; and identifying said virtual parent object of said virtual parent objects corresponding to said gazed virtual child object, based on said gazed virtual child object identified and an object hierarchy associated to said virtual parent object.

16. A method for implementing gaze translucency according to claim 15, wherein said method further comprises:

identifying, for said user, said gazed virtual child object of said virtual parent object of said virtual parent objects based on said determined distance and additionally semantic information.

17. A non-transitory computer-readable medium storing, program instructions that, when executed by a processor, cause an apparatus to perform the method according to claim 15.

18. The method according to claim 15, further comprising:

assigning a modification command to at least one of said gazed virtual child object and said first virtual parent object, based on said identified gazed virtual child object.

19. The method according to claim 18, further comprising:

modifying at least one of said gazed virtual child object and said first virtual parent object, based on said assigned modification command.

\* \* \* \* \*